Jan. 7, 1964  D. H. ROSE  3,116,806
TRACTOR CUTOFF SWITCH
Filed June 7, 1962  2 Sheets-Sheet 1
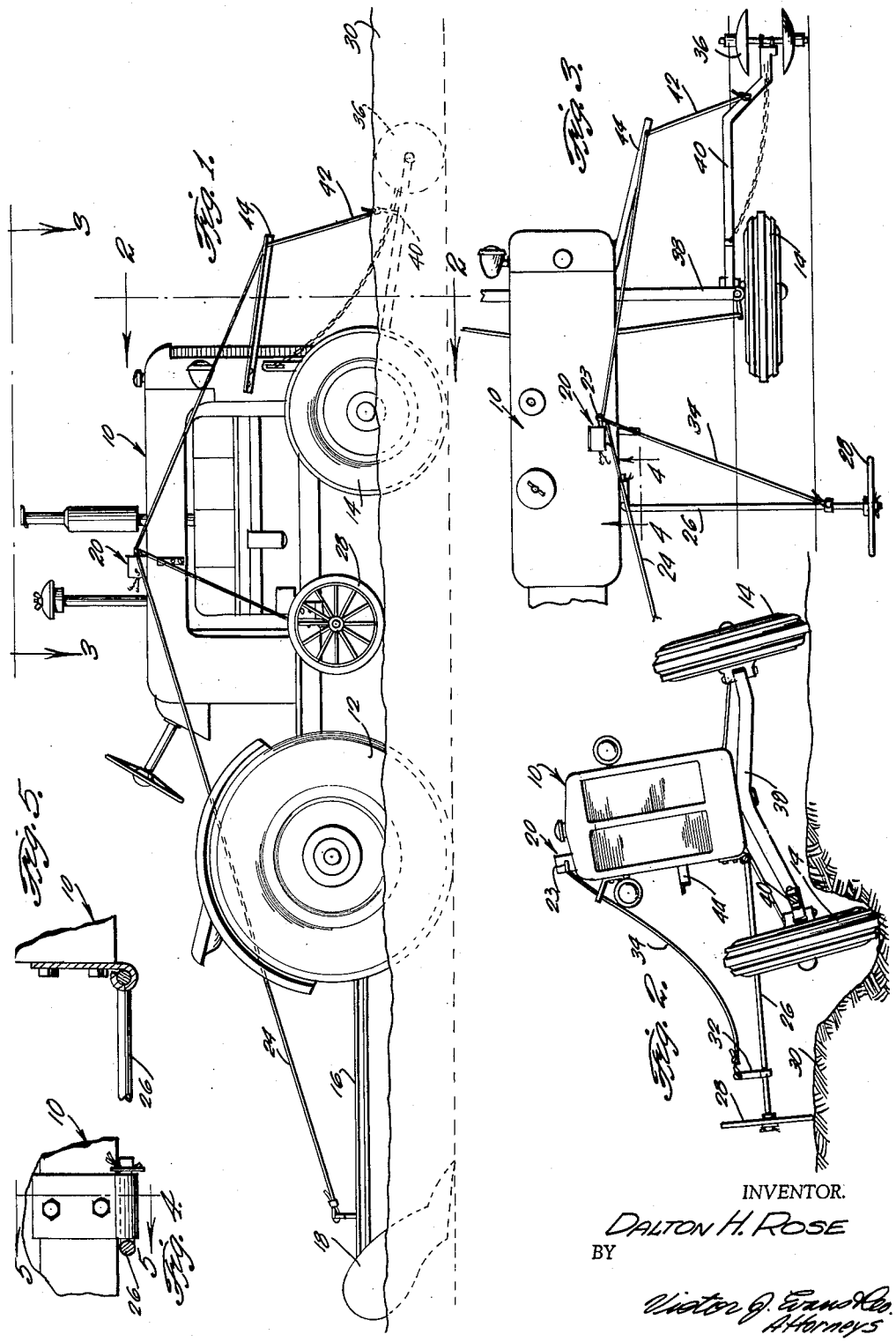
INVENTOR.
DALTON H. ROSE
BY
*Victor J. Evans & Co.*
Attorneys Jan. 7, 1964  D. H. ROSE  3,116,806
TRACTOR CUTOFF SWITCH
Filed June 7, 1962  2 Sheets-Sheet 2
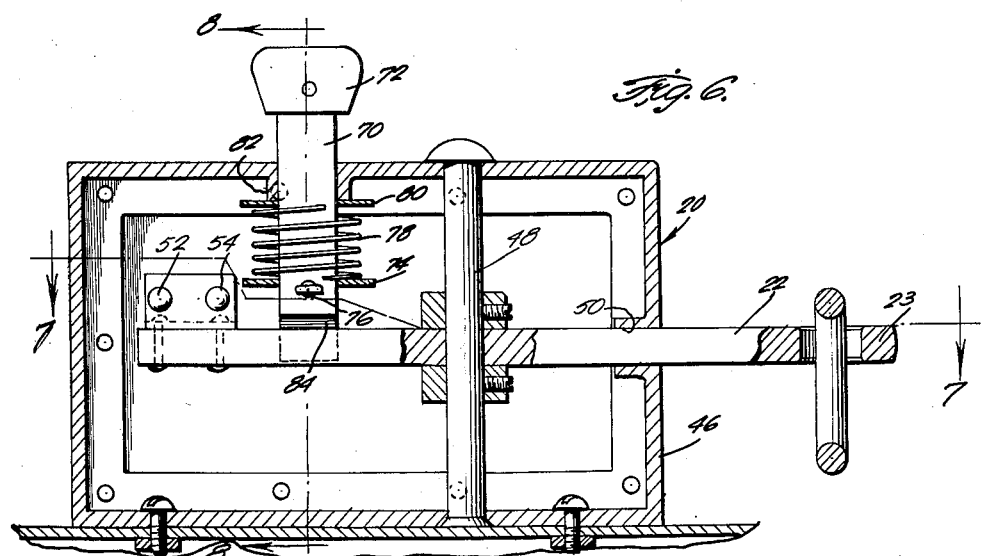
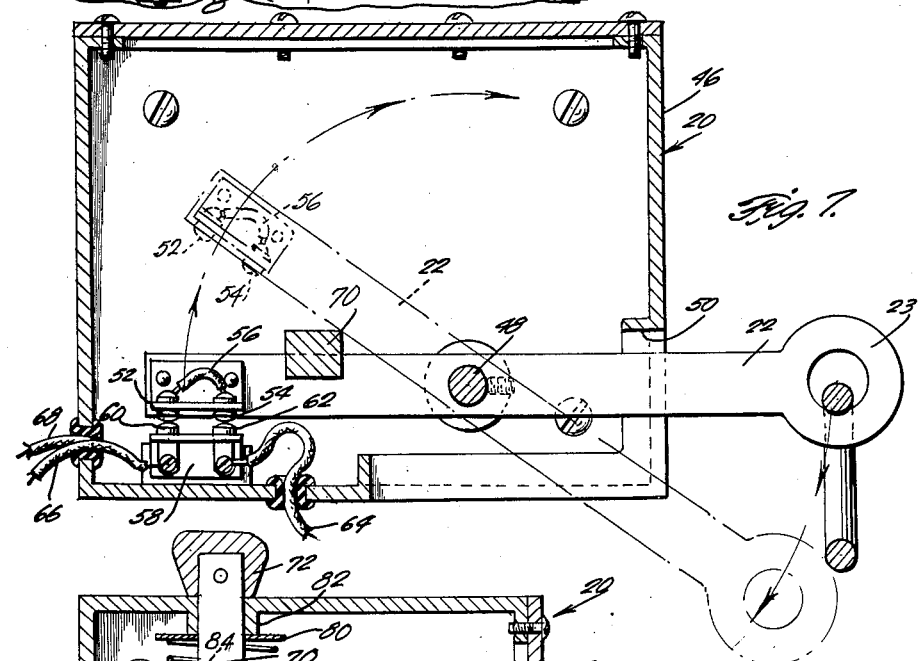
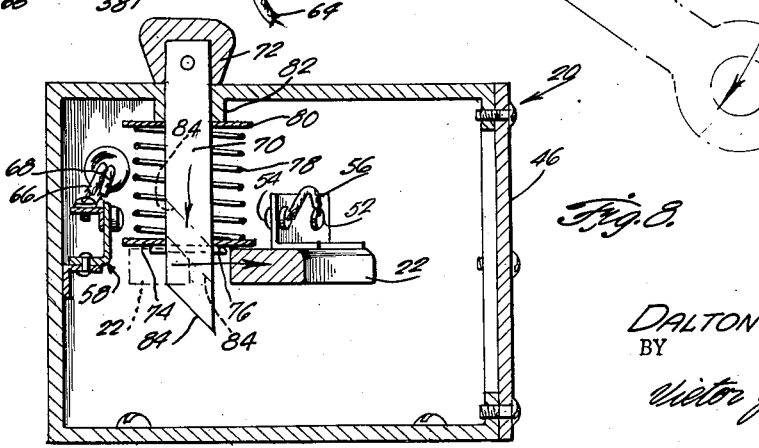
INVENTOR.
DALTON H. ROSE
BY
*Victor J. Evans & Co.*
Attorneys

United States Patent Office 3,116,806
Patented Jan. 7, 1964

3,116,806
TRACTOR CUTOFF SWITCH
Dalton H. Rose, 1217 S. Third, Brownfield, Tex.
Filed June 7, 1962, Ser. No. 200,749
1 Claim. (Cl. 180—82)

The present invention relates to tractors generally and in particular to a cutoff switch for the ignition of the tractor.

Presently in use are tractors which are adapted for operation without an operator. Several tractors may be employed upon a large tract of ground to plow the ground in continuous outwardly spiraling furrows, one tractor following another in the furrow and cutting a further furrow.

Occasionally it has happened that a tractor for one reason or another will leave the furrow and cause damage to itself or to other tractors or to other equipment before it can be boarded and stopped.

The present invention has for its primary object a cutoff switch which cuts the ignition on a tractor when the tractor is employed as a self-operating tractor and when it leaves the furrow which guides it in its self-operation.

Another object of the present invention is to provide a cutoff switch which may be manually engaged so that it permits the tractor to be operated on level ground or over a roadway.

A further object of the present invention is to provide a cutoff switch and other tractor attachments for permitting automatic operation of a tractor in a furrow to cut an outwardly spiraling furrow in a tract of land.

These and other objects and advantages of the present invention will be fully apparent from the following description when taken in connection with the annexed drawings, in which:

FIGURE 1 is a side elevational view of a tractor showing the switch of the present invention mounted thereon and showing the attachments which actuate the switch.

FIGURE 2 is a view taken on the line 2—2 of FIGURE 1,

FIGURE 3 is a fragmentary view of the assembly shown in FIGURE 1 taken on the line 3—3 of FIGURE 1, FIGURE 4 is a view on an enlarged scale, taken on the line 4—4 of FIGURE 3, FIGURE 5 is a view taken on the line 5—5 of FIGURE 4, FIGURE 6 is a view partially in section of the switch shown in FIGURE 1, on an enlarged scale, the switch being in a closed position and locked for travel over a roadway, FIGURE 7 is a view taken on the line 7—7 of FIGURE 6, and FIGURE 8 is a view taken on the line 8—8 of FIGURE 6.

With reference to the drawings in detail, in which like numerals indicate like parts throughout the several views, in FIGURES 1 to 3, the numeral 10 designates generally a tractor having a pair of drive wheels 12, one of which is shown, and a pair of front wheels 14. A draw bar 16 projects rearwardly from the tractor 10 and carries on its free end one or more plows 18.

The switch of the present invention is designated by the numeral 20. As will be seen in FIGURES 6 to 8, inclusive, the switch 20 includes an actuating lever 22 having an eye formation 23 on the free end thereof.

With reference to FIGURES 1 to 3, it will be seen that a cable or rope 24 extends from the draw bar 16 to the switch 20 to where it is fastened to the eye formation 23.

Outwardly of the side of the tractor 10 is hingedly connected an axle 26 on the free end of which is a freely rotatable wheel 28 rollably engaging the ground surface 30.

Forwardly of the wheel 14 which is on the same side of the tractor 10 as the wheel 28 is a guide assembly 36 hingedly connected to the front axle 38 on which the wheel 14 is mounted. An arm 40 projects forwardly of the hinge connection to the axle 38 for swinging movement upwardly and downwardly and the guide wheel assembly 36 is on the forward end of the arm 40. A cable 42 extends from a point on the arm 40 rearwardly of the assembly 36, through a guide arm 44 to the eye formation 23 on the switch 20.

With reference to FIGURES 6 to 8, the switch 20 is seen to comprise a housing 46 in which there is a fixed shaft 48 on which is mounted the lever 22 for swinging movement upwardly and downwardly about the shaft 48 as an axis. The housing 46 is provided with a slot 50 allowing free movement of the lever 22 from the full line position shown in FIGURE 7 to the dotted line position.

On the end of the lever 22 remote from the eye formation 23 is a pair of contacts 52 and 54 connected together by a wire 56.

On the inner wall of the housing 46 is a mounting block 58 on which there are contacts 60 and 62. A wire 64 connects the contacts 62 to the battery tractor ignition circuit. Other wires 66 and 68 extend to the input side of the ignition system and to the lights of the tractor.

Means is provided for holding the switch in inoperative position when it is desired to travel over a roadway or to move the tractor from one field to another. This means consists in a plunger 70 mounted for reciprocal movement in the wall of the housing 46.

The plunger 70 has a knob 72 on one end thereof and a washer 74 inwardly of the other end. The washer is secured by a cotter pin 76 and a coil spring 78 is interposed between the washer 74 and another washer 80 which bears against a bushing portion 82 of the housing 46 through which the plunger 70 is slidably mounted.

The end portion of the plunger 70 remote from the knob 72 is beveled, as at 84, and when the lever 22 is in the closed position, this beveled portion 84 bears against the lever 22 as shown in dotted lines in FIGURE 8.

Upon upward swinging movement of the lever 22 to disengage the contacts the beveled portion 84 of the plunger 70 permits the lever 22 to move the plunger 70 outwardly against compression of the spring 78 so that the lever 22 is free to move to the dotted line position shown in FIGURE 7. Immediately thereafter the spring 78 forces the plunger 70 back into position blocking the return movement of the lever 22.

In use, in a large tract to be plowed, an operator plows a single circular furrow ending in a spiral portion. The tractor is positioned so that both of its wheels on one side adjacent the wheel 28 are in the furrow. The guide wheel assembly 36 is forwardly of the front wheel 14 and guides the wheel 14 by bearing against either one side or the other side of the furrow. The wheel 28 is exteriorly of the furrow and rides on the ground surface 30. Should the plow 18 be lost, the draw bar 16 would drop and the rope 24 would pull the lever 22 from the switch close position to the switch open position. Should the guide wheel assembly 36 be lost and it would fall away from the tractor and the tractor would move beyond it pulling the rope or cable 42 and actuating the switch to open position.

Should the tractor 10 disengage itself from the furrow and the wheel 14 in the front on the side of the tractor adjacent the guide wheel 28 rise out of the furrow, the dropping of the guide wheel 28 would effect pulling of the switch from the closed position to the open position.

It will be seen therefore that every provision is made for keeping the tractor operating in the furrow in ever increasingly longer spiral tract about the first furrow which is cut with the operator. Obviously, other tractors may follow in the furrow and as many plows 18 may be employed as is desired and as the tractors follow each other around the furrow an increasingly larger spiral area will be plowed.

While only a preferred embodiment of the invention is shown and described, it will be found that in the manufacturing of the device of the present invention changes and modifications may be desirable and such may be made within the spirit of the invention as set forth in the appended claim.

What is claimed is:

In a self guided tractor having an ignition circuit and a guide wheel positioned forwardly of a front wheel and adapted to ride in a furrow previously cut in a ground surface, and a cable having one end operatively connected to said guide wheel, the improvement consisting in a self-locking switch assembly comprising a housing provided with a slot in one wall thereof, a lever pivotally mounted in said housing and having the portion adjacent one end projecting through said slot and exteriorly of said housing, a pair of spaced contacts in said circuit fixedly mounted in said housing, an electrically connected pair of contacts carried by the other end portion of said lever and normally in circuit closing position with respect to the first mentioned pair of contacts, a plunger slidably mounted in another wall of said housing, said plunger having a portion adjacent one end beveled and in the path of movement of the part of said lever inwardly of and adjacent said other end, said lever part bearing against said plunger portion and being operable to shift said plunger outwardly of said housing another wall upon execution of pivotal movement of said lever from the normal position to a circuit open position in which said second named pair of contacts are out of circuit closing position with respect to said first named pair of contacts, spring means connected to said plunger and operable to shift said plunger to a position blocking the movement of said lever to the circuit closing position after execution of movement of said lever from the normal position to the circuit open position, and other spring means operatively connected to said lever urging said lever to the normal position, said lever one end being connected to the other end of said cable.

References Cited in the file of this patent
UNITED STATES PATENTS

| | | |
|---|---|---|
| 1,540,634 | Kirchhoff | June 2, 1925 |
| 1,567,853 | McKee | Dec. 29, 1925 |
| 1,889,906 | Swan | Dec. 6, 1932 |
| 2,540,653 | Claypool | Feb. 6, 1951 |